United States Patent [19]
Solomon, Jr.

[11] Patent Number: 5,094,427
[45] Date of Patent: Mar. 10, 1992

[54] FLAT PLATE BACK PRESSURE REGULATOR

[75] Inventor: Collins Solomon, Jr., Fullerton, Calif.

[73] Assignee: Chevron Research and Technology Company, San Francisco, Calif.

[21] Appl. No.: 703,960

[22] Filed: May 22, 1991

[51] Int. Cl.$^5$ .................................... F16K 31/126
[52] U.S. Cl. .................................... 251/61.1; 251/331
[58] Field of Search .......................... 251/61.1, 331

[56] References Cited

U.S. PATENT DOCUMENTS

| | | | |
|---|---|---|---|
| 4,607,013 | 3/1987 | Giachino | 251/331 |
| 4,703,913 | 11/1987 | Hunkapiller | 251/61.1 |
| 4,846,215 | 6/1989 | Barree | 137/510 |
| 4,852,851 | 8/1989 | Webster | 251/61.1 |
| 4,858,883 | 8/1989 | Webster | 251/61.1 |

*Primary Examiner*—Alan Cohan
*Attorney, Agent, or Firm*—Edward J. Keeling; Ernest A. Schaal

[57] ABSTRACT

A pressure regulator has a diaphragm mounted upon a base to form a flow chamber between the diaphragm and the base. A dome pressure casing is mounted upon the base to form a cavity between the casing and the diaphragm. One piece of tubing is connected either to the base or to the casing and passes sequentially through the base or casing, through the cavity, and through the diaphgram to the flow chamber for inlet fluid injection through the flow chamber. Another piece of tubing is connected either to the base or to the casing and passes sequentially from the flow chamber, through the diaphragm, through the cavity, and through the base or casing for fluid discharge. A pressure port within the dome pressure casing permits the supply of pressure to the diaphragm to restrict the fluid flow through the flow chamber.

7 Claims, 2 Drawing Sheets

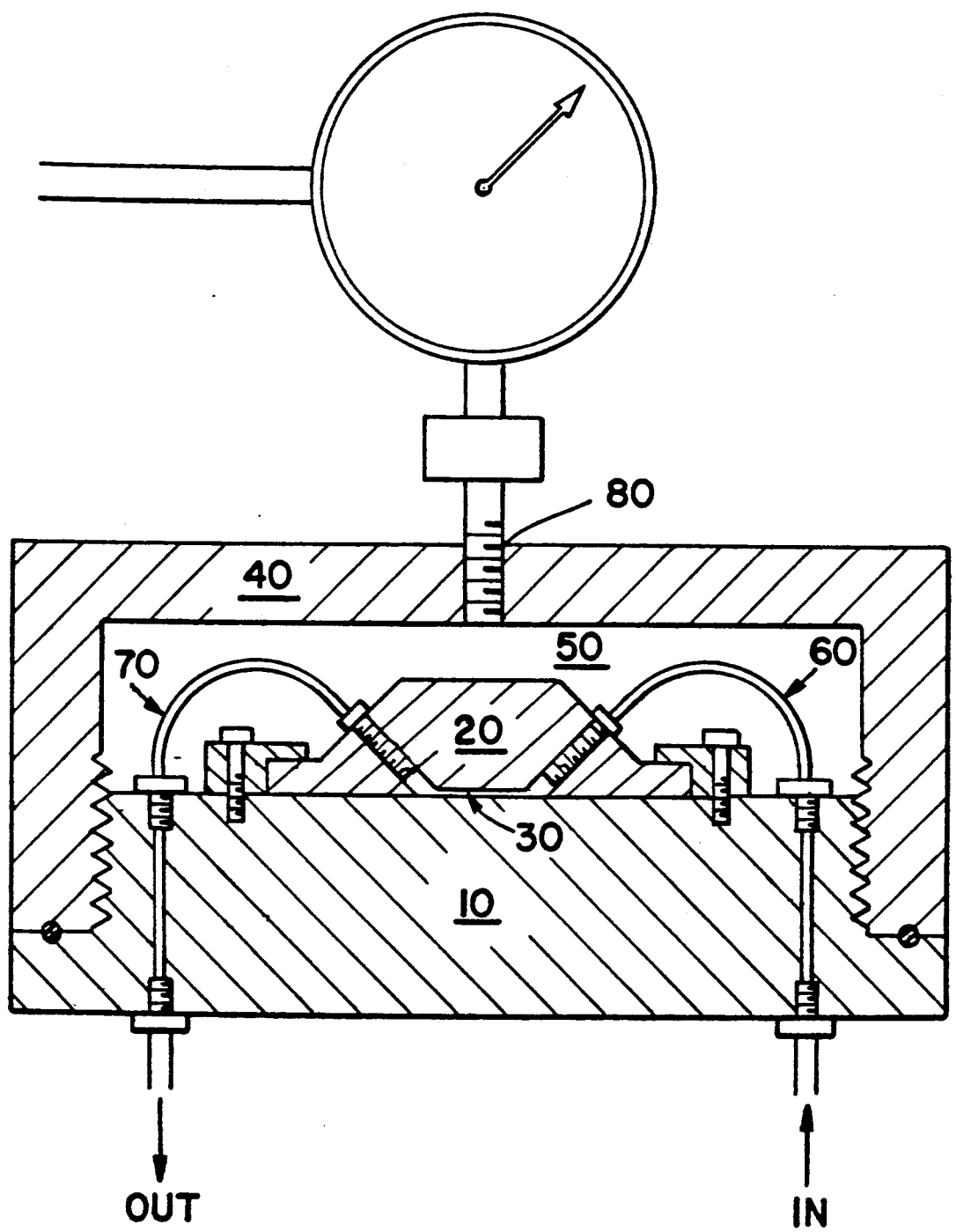
FIG_1

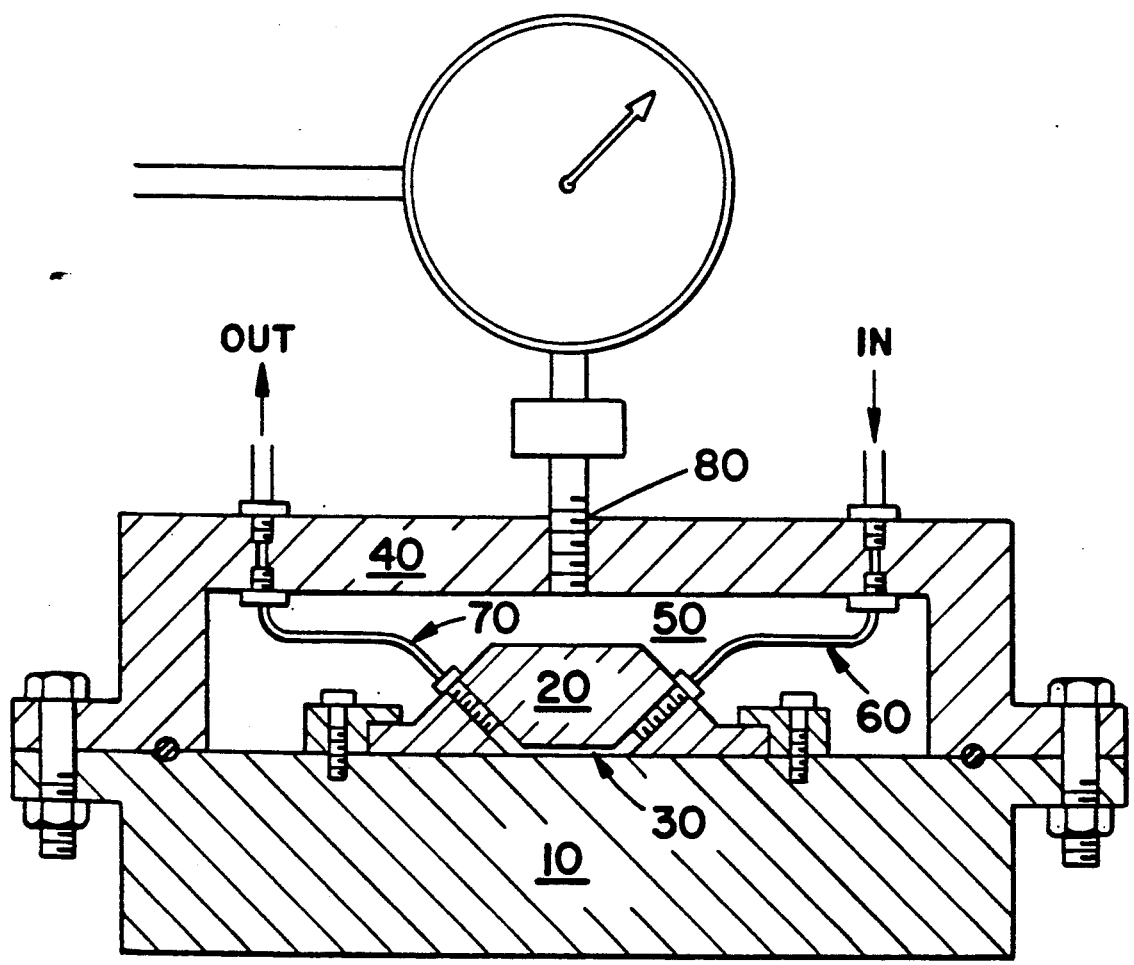
FIG_2

FLAT PLATE BACK PRESSURE REGULATOR

The present invention relates to a back pressure regulator that allows for constant pressure regulation of any gas or liquid flow system. More particularly, it relates to a back pressure regulator of the diaphragm type.

BACKGROUND OF THE INVENTION

The purpose of this invention is to allow for constant pressure regulation for high or low pressure fluid flow systems. This unique design enables the use of thinner stainless steel diaphragms for increased sensitivity. It also greatly increases the maximum control factor and pressure at which the diaphragm will rupture.

SUMMARY OF THE INVENTION

In the present invention, fluid pressure is regulated by applying pressure to the diaphragm which in turn shuts off the flow chamber. Fluid is then restricted as it flows through a flow chamber between the diaphragm and a base. The fluid enters and leaves the flow chamber through tubing that passes through the diaphragm.

The present invention has a diaphragm mounted upon a base to form a flow chamber between the diaphragm and the base. A dome pressure casing is mounted upon the base to form a cavity between the casing and the diaphragm. A pressure port within the dome pressure casing allows supply of pressure to the diaphragm to restrict the fluid flow through the flow chamber. The dome pressure casing and the base can be bolted together or threaded together.

There are two embodiments for fluid entering the flow chamber. In one embodiment, the fluid enters the flow chamber through tubing that is connected to the base and passes sequentially through the base, through the cavity, and through the diaphragm to the flow chamber. In the other embodiment, the fluid enters the flow chamber through tubing that is connected to the dome pressure casing and passes sequentally through the dome pressure casing, through the cavity, and through the diaphragm to the flow chamber.

There are two embodiments for fluid leaving the flow chamber. In one embodiment, the fluid leaves the flow chamber through tubing that is connected to the base and passes sequentially from the flow chamber, through the diaphragm, through the cavity, and through the base. In the other embodiment, the fluid leaves the flow chamber through tubing that is connected to the dome pressure casing and passes sequentially from the flow chamber, through the diaphragm, through the cavity, and through the dome pressure casing for fluid discharge.

BRIEF DESCRIPTION OF THE DRAWINGS

In order to facilitate the understanding of this invention, reference will now be made to the appended drawings of the preferred embodiments of the present invention. The drawings are exemplary only, and should not be construed as limiting the invention.

FIG. 1 is a schematic drawing of an embodiment of the present invention, in which the fluid whose pressure is regulated enters and leaves the flow chamber through tubing that passes through the base, cavity, and diaphragm.

FIG. 2 is a schematic drawing of a second embodiment of the present invention, in which the fluid whose pressure is regulated enters and leave the flow chamber through tubing that passes through the dome pressure casing, cavity, and diaphragm.

DETAILED DESCRIPTION OF THE INVENTION

In its broadest aspect, the present invention involves a pressure regulator in which the fluid whose pressure is regulated enters and leaves the flow chamber through tubing that passes through the diaphragm. By enabling the use of carbon dioxide resistant ethylene propylene diaphragms, this particular back pressure regulator will eliminate the problem of cracking of diaphragms experienced when using conventional back pressure regulators at high pressures and temperatures with carbon dioxide. Carbon dioxide affects diaphragms made of Buena-N, Viton, and Teflon at high temperatures and pressures, but does not appear to affect ethylene propylene diaphragms. Premature rupturing of thin diaphragms is also eliminated, while maintaining appropriate sensitivity.

A diaphragm is mounted upon a base to form a flow chamber between the diaphragm and the base. By "diaphragm," we mean a flexible dividing membrane. By "mounted," we mean attached to a support. By "base," we mean support for the diaphragm. In FIGS. 1 and 2, the base constitutes the bottom half of the outer shell of the back pressure regulator. By "flow chamber," we mean a space between the diaphragm and the base.

A dome pressure casing is mounted upon the base to form a cavity between the casing and the diaphragm. By "dome pressure casing," we mean the diaphragm cover. In FIGS. 1 and 2, the dome pressure casing contitutes the top half of the outer shell of the back pressure regulator. By "cavity," we mean a void space between the casing and the diaphragm.

Together, the dome pressure casing and the base contitute the outer shell of the pressure regulator. The casing and base are bolted or threaded together with an o-ring seal or soft seat metal. By "bolted together," we mean that the dome pressure casing and base are fastened together with bolts. By "threaded together," we mean that the dome pressure casing and base are screwed together with threads.

Two stainless steel square or round body halves rated for at least 6,000 psi. can be used for the dome pressure casing and the base for high pressure systems. The proper positioning of this chamber will allow for a very high dome pressure of more than 6,000 psi without experiencing a blow out effect of the diaphragm through the tubing U-holes.

A durable plastic may be used for the casing and base in place of stainless steel for low pressure systems. Teflon, Viton, or Buena-N can be substituted for the stainless steel foil chamber for low pressure liquid systems.

Optionally, two pieces of 0.003 stainless steel foil can be used instead of one for a much smoother surface in the flow chamber. In this embodiment, the flow chamber is formed by the two pieces of steel foil.

In the present invention, fluid enters the flow chamber through an inlet tubing means and fluid leaves the flow chamber through an outlet tubing means. By "inlet tubing means," we mean tubing that provides a passageway through the diaphragm into the flow chamber. By "outlet tubing means," we mean tubing that provides a passageway through the diaphragm from the flow chamber. One-eighth inch diameter stainless steel lengths of tubing can be used for both the inlet tubing means and the outlet tubing means.

There are two alternatives for how the inlet tubing means is connected. In one embodiment, the inlet tubing means is connected to the base and passes sequentially through the base, through the cavity, and through the diaphragm to the flow chamber for inlet fluid injection through the flow chamber. In the other embodiment, the inlet tubing means is connected to the dome pressure casing and passes sequentially through the dome pressure casing, through the cavity, and through the diaphragm to the flow chamber for inlet fluid injection through the flow chamber.

There are two alternatives for how the outlet tubing means is connected. In one embodiment, the outlet tubing means is connected to the base and passes sequentially from the flow chamber, through the diaphragm, through the cavity, and through the base for fluid discharge. In the other embodiment, the outlet tubing means is connected to the dome pressure casing and passes sequentially from the flow chamber, through the diaphragm through the cavity, and through the dome pressure casing for fluid discharge.

A pressure port within the dome pressure casing allows supply of pressure to the diaphragm to restrict the fluid flow through the flow chamber. By "supply of pressure," we mean provide a source of pressure, that source being a fluid or gas. By "to restrict the fluid flow through the flow chamber," we mean to stop the flow by applying pressure to the diaphragm and clamping the flow chamber shut.

Referring to FIG. 1, which is one embodiment of the present invention, diaphragm 20 is mounted upon a base 10 to form a flow chamber 30 between the diaphragm 20 and the base 10. Dome pressure casing 40 is mounted upon the base 10 to form a cavity 50 between the casing 40 and the diaphragm 20. The casing 40 and the base 10 are threaded together. Inlet tubing means 60 is connected to the base 10 and passes sequentially through the base 10, through the cavity 50, and through the diaphragm 20 to the flow chamber 30 for inlet fluid injection through the flow chamber 30. Outlet tubing means 70 is connected to the base 10 and passes sequentially from the flow chamber 30, through the diaphragm 20, through the cavity 50, and through the base 10 for fluid discharge. A pressure port 80 within the dome pressure casing 40 permits the supply of pressure of the diaphragm 20 to restrict the fluid flow through the flow chamber 30.

Referring to FIG. 2, which is one embodiment of the present invention, notice the similarities of that embodiment to the embodiment shown in FIG. 1. As in FIG. 1, diaphragm 20 is mounted upon a base 10 to form a flow chamber 30 between the diaphragm 20 and the base 10. As in FIG. 1, dome pressure casing 40 is mounted upon the base 10 to form a cavity 50 between the casing 40 and the diaphragm 20. As in FIG. 1, a pressure port 80 within the dome pressure casing 40 permits the supply of pressure to the diaphragm 20 to restrict the fluid flow through the flow chamber 30.

Unlike the embodiment shown in FIG. 1, the casing 40 and the base 10 of the embodiment shown in FIG. 2 are bolted together. The inlet tubing means 60 is connected to casing 40 (instead of the base) and passes sequentially through casing 40, through the cavity 50, and through the diaphragm 20 to the flow chamber 30 for inlet fluid injection through the flow chamber 30. The outlet tubing means 70 is connected to casing 40 and passes sequentially from the flow chamber 30, through the diaphragm 20, through the cavity 50, and through the casing 40 for fluid discharge.

While the present invention has been described with reference to specific embodiments, this application is intended to cover those various changes and substitutions which may be made by those skilled in the art without departing from the spirit and scope of the appended claims.

What is claimed is:

1. A pressure regulator comprising:
    (a) a diaphragm mounted upon a base to form a flow chamber between the diaphragm and the base;
    (b) a dome pressure casing mounted upon the base to form a cavity between the casing and the diaphragm, wherein the dome pressure casing and the base, together, constitute an outer shell of the regulator;
    (c) an inlet tubing means connected to the outer shell and passing sequentially through the outer shell, through the cavity, and through the diaphragm to the flow chamber for inlet fluid injection through the flow chamber;
    (d) an outlet tubing means connected to the outer shell and passing sequentially from the flow chamber, through the diaphragm and through the cavity, and through the outer shell for fluid discharge; and
    (e) a pressure port within the dome pressure casing that permits the supply of pressure to the diaphragm to restrict the fluid flow through the flow chamber.

2. A pressure regulator according to claim 1 wherein the inlet tubing means is connected to the base and passes sequentially through the base, through the cavity, and through the diaphragm to the flow chamber for inlet fluid injection through the flow chamber.

3. A pressure regulator according to claim 1 wherein the inlet tubing means is connected to the dome pressure casing and passes sequentially through the dome pressure casing, through the cavity, and through the diaphragm to the flow chamber for inlet fluid injection through the flow chamber.

4. A pressure regulator according to claim 1 wherein the outlet tubing means is connected to the base and passes sequentially from the flow chamber, through the diaphragm, through the cavity, and through the base for fluid discharge.

5. A pressure regulator according to claim 1 wherein the outlet tubing means is connected to the dome pressure casing and passes sequentially from the flow chamber, through the diaphragm, through the cavity, and through the dome pressure casing for fluid discharge.

6. A pressure regulator according to claim 1 wherein the dome pressure casing and the base are bolted together.

7. A pressure regulator according to claim 1 wherein the dome pressure casing and the base are threaded together.

* * * * *